Patented May 14, 1946

2,400,120

UNITED STATES PATENT OFFICE 2,400,120

PHOSPHATIDE COMPOSITION AND METHOD OF PREPARING

Percy L. Julian, Maywood, and Edwin W. Meyer, Evanston, Ill., assignors, by mesne assignments, to American Lecithin Company, Cleveland, Ohio, a corporation of Ohio No Drawing. Application July 25, 1941, Serial No. 403,991

17 Claims. (Cl. 252—1)

The present invention relates to phosphatides and particularly relates to a process for modifying some of the properties of phosphatides and mixtures containing phosphatides, and to the products produced thereby.

Phosphatides as commercially prepared from soybeans, corn oil, cottonseed oil, etc., are usually prepared containing some fat or oil in a minor proportion as a carrier for the phosphatides. The pure phosphatides have poor stability and the oil or fat acts as a stabilizer. The oils may either be the oils from which the phosphatide was obtained, or may be some other oil or fat such as cocoa-butter. Soybean phosphatides as commercially prepared from the emulsion obtained by treating the oil with steam or water usually contain 55–65% phosphatides and about 35–45% oil. So called "cocoa butter lecithin" as commercially prepared usually contains around 20% cocoa butter.

The phosphatide-oil mixtures prepared are frequently of a solid or heavy consistency and frequently vary in consistency. Since the phosphatide mixtures are used almost exclusively in small amounts, in admixture with liquids and solids, in which uses its effectiveness is dependent, to a considerable extent, upon its uniform incorporation, it is very desirable that a fluid material of uniform consistency be employed.

Also there are numerous uses of phosphatides, which are emulsifying agents, in which the emulsifying property is undesirable. Among these uses may be mentioned the use in lubricating oils, as a varnish inhibitor.

It is accordingly an object of this invention to provide a process for treating phosphatide and oil mixtures to control the viscosity.

A further object of this invention is to provide a process for treating phosphatides to destroy or lessen their emulsifying properties.

Another object is to provide a composition of phosphatides and oil having a lowered viscosity.

Other objects will appear from the following description of the invention.

It has been found that the desired objects of the invention may be accomplished by treating a mixture of phosphatides and glyceride oil or fat with oil-soluble, acid-liberating materials such as acyl halides, sulfonyl halides, acyl pyridinium halides, substituted pyridinium halides and the like, which are capable of reducing the pH value of the phosphatide. However, in order to bring about this reduced pH value it is important that the acid be thoroughly distributed throughout the phosphatide mass. By adding oil-soluble, acid- liberating materials to a mixture of phosphatide and glyceride oil, this lowering of the pH value is accomplished.

The amount of acid material used may vary over a considerable range. For the reduction of viscosity, increasing amounts up to a certain point appear to produce increasingly lowered viscosity. The change in emulsifying properties appears to be dependent upon the nature of the charge or charges upon the phosphatide molecule. Rather small amounts produce decreased viscosity, and amounts of about 5% or more bring about a marked decrease in the emulsifying properties.

Compounds like phosphatides, of the lecithin variety are "zwitter ions," and have long been recognized as good emulsifying agents since they contain a large oil soluble residue in the molecule as well as water soluble groupings. Thus the amino groups and the phosphoric acid groups have a tendency to be attracted to water, while the fatty acid portions would tend to be attracted to the oil. By treating the phosphatide with acids the charges upon the "zwitter ion" which tend to cause water solubility are neutralized, with a resulting decrease in water solubility and increase in oil solubility. Since the effect of the water attracting group has been nullified or minimized, the tendency to emulsification is decreased.

As a consequence of the increased oil solubility of the phosphatide the viscosity of the oil solution is decreased. Simultaneously, therefore, with the decreasing of the emulsifying properties a mixture of phosphatide and oil is more nearly a true solution than would be the case with the untreated phosphatide. Thus such a mixture would be of softer consistency.

Compounds which have been found suitable are oil-soluble compounds having the formula R.COX, those having the formula R.SO₂X, and those containing the group

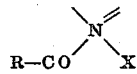

in which R is a hydrocarbon group and X is a halide radical, such as a chloride radical. Among the compounds having these formulas which have been found suitable may be mentioned stearoyl chloride, stearoyl pyridinium chloride, and toluene sulfonyl chloride. Other compounds such as soya fatty acid chloride, stearoyl quinolinium chloride, stearoyl acridinium chloride, benzoyl pyridinium chloride, benzene sulfonyl chloride, etc., may be used. In general any acid-liberating compound which is soluble or dispersible in the phosphatide-oil mixture may be used. The acid-liberating materials are preferably incorporated into the melted mixtures of phosphatide and oil or fat.

EXAMPLE I

To aliquot parts of a mixture of soybean phosphatides and soybean oil containing about 65 parts of phosphatide and about 35 parts of soybean oil was incorporated varying amounts of stearoyl pyridinium chloride. The acid-liberating material was incorporated by mixing at about 80° C. The emulsifying properties were then determined by the Navy Emulsion Test, which is United States Government Test No. 320.12, as follows:

40 ml. of water and 40 ml. of lubricating oil containing 0.1% by weight of the oil of the phosphatide-oil-acid mixture were added to a graduated cylinder. The cylinder was immersed in a heating liquid and a temperature of 180° F. was maintained during the test. The mixture was agitated for 5 minutes and allowed to stand at the test temperature for specified times. The mixture separated into three layers, an oil layer, a water layer and an emulsion layer. The number of ml. in the emulsion layers, and the pH of the water layer were noted. The results are shown in Table I.

EXAMPLE II

The tests of Example I were repeated, using stearoyl chloride. The results are shown in Table I.

EXAMPLE III

The tests of Examples I and II were repeated using toluene sulfonyl chloride, the results being shown in Table I.

EXAMPLE IV

Tests similar to those of the foregoing examples were made using soya oil fatty acid chlorides, except that 3% of the acid chloride was used in the soya bean phosphatide-oil mixture, and varying amounts of the phosphatide-oil-acid chloride mixture used for the emulsification test. The results are shown in Table II.

TABLE I

| Acid material | Amount used | Ml. of emulsion | | | | pH of water |
|---|---|---|---|---|---|---|
| | | 15 min. | 30 min. | 45 min. | 60 min. | |
| | Per cent | | | | | |
| Untreated lecithin | | 49.0 | 46.0 | 46.0 | 44.0 | 6.00 |
| Stearoyl pyridinium chloride | 1 | 47.5 | 44.0 | 42.0 | 40.5 | 4.68 |
| Do | 2.5 | 43.5 | 40.0 | 39.5 | 38.0 | 4.10 |
| Do | 5.0 | 3.0 | 2.0 | 1.5 | 1.5 | 3.75 |
| Do | 10.0 | .3.0 | 3.0 | 3.0 | 3.0 | 3.60 |
| Stearoyl chloride | 2 | 48.5 | 45.0 | 42.0 | 42.0 | 5.8 |
| Do | 3 | 35.0 | 26.5 | 16.0 | 13.0 | 5.72 |
| Do | 4 | 4.0 | 2.5 | 2.0 | 2.0 | 5.10 |
| Do | 5 | 2.5 | 2.0 | 1.5 | 1.0 | 3.42 |
| Toluene sulfonyl chloride | 4 | 0.5 | 0.0 | 0.0 | 0.0 | 4.10 |
| Do | 5 | 2.0 | 1.0 | 1.0 | 0.5 | 4.05 |

TABLE II

3% of soya acid chloride used with phosphatide-oil mixture

| Per cent of phosphatide-oil-acid chloride mixture used in emulsification test | Ml. of emulsion | | | |
|---|---|---|---|---|
| | 15 min. | 30 min. | 45 min. | 60 min. |
| 0.1 | 49.0 | 44.0 | 42.0 | 42.0 |
| 0.2 | 30.0 | 17.0 | 14.0 | 12.0 |
| 0.3 | 6.0 | 6.0 | 5.0 | 5.0 |

In all cases the addition of the acid-forming material brought about a reduction in the viscosity of the phosphatide-oil mixture. It is to be noted, however, that substantial reduction in emulsifying power does not occur upon the addition of the smaller quantities of acid-forming material.

It is important that the acid-forming materials be dispersed throughout the phosphatide mass, and it is for this reason that compounds of good oil solubility are preferred. The amount of acid added will depend somewhat upon the particular composition of the phosphatide-oil mixture, upon the particular acid used, upon the particular viscosity desired, and upon the desired emulsifying properties. For the reduction of viscosity increasing the amounts up to a certain point appears to produce increasingly lowered viscosity. The change in emulsifying properties appears to be dependent upon the nature of the charge or charges upon the phosphatide molecule. Thus while rather small amounts produce desired viscosities a substantial reduction in emulsifying power does not occur upon the addition of the smaller quantities but appears to take place only upon the addition of a sufficient amount of acid to produce the proper reduction of the pH value of the mixture. pH values determined on the water layer formed by emulsifying lubricating oil with water and employing the acid treated phosphatide-glyceride oil mixture indicate that the pH value at which substantial reduction in emulsifying begins generally lies in the range of pH 3.7 to 4.3 or approximately 4. Applicants, however, do not wish to be understood as meaning that the pH value of the water layer is necessarily or always a true indication of the pH value of the dry mixture itself or of the true condition of the charges upon the phosphatide molecule. The pH value obtained in the water layer may depend to some extent upon the amount of the particular acid dissolved in the water. However, the dry phosphatide-oil mixture is of a lipophilic nature and consequently the pH of an aqueous solution of an acid may not necessarily represent the true condition of the charges upon the phosphatide molecule. The decrease in the emulsifying properties, however, does occur rather sharply and may be readily determined. While the emulsifying properties do not substantially decrease until this critical point is reached more acid may be added if desired and still produce the lowered viscosity and decreased emulsifying properties. Acid-forming materials which are poorly dispersed, while showing some of the advantages of the present invention to the extent that they are dispersed, are not as desirable as the more readily dispersible materials.

It is not to be understood from the foregoing description that a mixture of oil and phosphatide must in all cases be treated or that the composition produced necessarily in all cases contains oil. Phosphatides alone may be treated or the oil may be removed from a treated oil-phosphatide mixture. In such cases the treated phosphatide will show lowered viscosity in oil solutions and where sufficient acidic substance is used will have decreased emulsifying power. Oil-phosphatide mixtures, however, are preferred.

Having described the invention, what is claimed is:

1. A composition of matter comprising a major amount of vegetable phosphatide and a small amount of an oil-dispersible, acid-liberating compound uniformly distributed throughout the mass in an amount sufficient to increase the oil solubility of the phosphatide.

2. A composition of matter comprising a mixture of a vegetable phosphatide, a glyceride oil, and a small amount of an oil-dispersible, acid-liberating compound uniformly distributed throughout the mass in an amount sufficient to increase the solubility of the phosphatide in the oil.

3. The composition of claim 1 in which the amount of acid-liberating substance is sufficient to also materially reduce the emulsifying property of the phosphatide.

4. The composition of claim 2 in which the amount of acid-liberating substance is sufficient to also materially reduce the emulsifying property of the phosphatide.

5. The process of preparing a phosphatide composition which comprises mixing the vegetable phosphatide with a small amount of an oil-dispersible, acid-liberating compound to uniformly distribute the acid-forming compound throughout the phosphatide mass in an amount sufficient to increase the oil solubility of the phosphatide.

6. The process which comprises mixing a small amount of an oil-dispersible, acid-liberating compound with a vegetable phosphatide-glyceride oil composition to uniformly distribute the acid-forming compound throughout the mass in an amount sufficient to increase the oil solubility of the phosphatide.

7. The process of claim 5 in which the amount of acid-liberating material is sufficient to also materially reduce the emulsifying property of the phosphatide.

8. The process of claim 6 in which the amount of acid-liberating material is sufficient to also materially reduce the emulsifying property of the phosphatide.

9. A composition of matter comprising a major amount of a vegetable phosphatide and a small amount of an oil-dispersible, acid-liberating compound of a halide acid uniformly distributed throughout the composition in an amount sufficient to materially decrease the emulsifying property of the phosphatide.

10. A composition of matter comprising a major amount of a vegetable phosphatide and a small amount of an oil dispersible acid liberating compound of a halide acid uniformly distributed throughout the composition in an amount sufficient to increase the oil solubility of the phosphatide.

11. A composition of matter comprising a major amount of a vegetable phosphatide, a glyceride oil and a small amount of an oil-dispersible, acid-liberating, compound of a halide acid uniformly distributed throughout the composition in an amount sufficient to increase the solubility of the phosphatide in the oil.

12. The composition of claim 9 in which the acid-liberating compound is a chloride.

13. The composition of claim 10 in which the acid liberating compound is a chloride.

14. The process of preparing a phosphatide composition of matter which comprises mixing with a vegetable phosphatide a small amount of an oil-dispersible acid-liberating, compound of a halogen acid to uniformly distribute the acid-liberating compound throughout the phosphatide mass in an amount sufficient to increase the oil solubility of the phosphatide.

15. The process of preparing a phosphatide composition of matter which comprises mixing with a vegetable phosphatide-glyceride oil mixture a small amount of an oil-dispersible, acid-liberating compound of a halide acid to uniformly distribute the acid-liberating compound throughout the phosphatide-oil mixture in an amount sufficient to increase the solubility of the phosphatide in the oil.

16. The process of claim 14 in which the acid-liberating compound is a chloride.

17. The process of claim 14 in which the acid-liberating compound is a chloride and is present in an amount sufficient to materially reduce the emulsifying properties of the phosphatide.

PERCY L. JULIAN.
EDWIN W. MEYER.